United States Patent
Xiao

(10) Patent No.: US 8,916,312 B2
(45) Date of Patent: Dec. 23, 2014

(54) BIPOLAR PLATE ASSEMBLY WITH THERMOPLASTIC SEALANT AND METHOD THEREFOR

(75) Inventor: Xinran Xiao, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 870 days.

(21) Appl. No.: 12/763,449

(22) Filed: Apr. 20, 2010

(65) Prior Publication Data

US 2011/0256471 A1   Oct. 20, 2011

(51) Int. Cl.
| | |
|---|---|
| *H01M 2/08* | (2006.01) |
| *H01M 8/04* | (2006.01) |
| *H01M 4/66* | (2006.01) |
| *B29C 65/36* | (2006.01) |
| *B29C 65/56* | (2006.01) |
| *B29C 65/78* | (2006.01) |
| *H01M 2/38* | (2006.01) |
| *H01M 8/02* | (2006.01) |

(52) U.S. Cl.
CPC .............. *H01M 8/0204* (2013.01); *Y02E 60/60* (2013.01); *H01M 8/0297* (2013.01); *H01M 8/0286* (2013.01); *H01M 8/0284* (2013.01)
USPC .......... 429/510; 429/457; 429/507; 429/508; 429/509; 429/514; 429/519; 156/304.3

(58) Field of Classification Search
USPC .............. 429/457, 463, 507–521; 156/304.3, 156/304.5
See application file for complete search history.

(56) References Cited

U.S. PATENT DOCUMENTS

| | | | | |
|---|---|---|---|---|
| 3,376,167 | A * | 4/1968 | Hughes et al. | 429/185 |
| 4,041,211 | A * | 8/1977 | Wiacek | 429/406 |
| 4,450,212 | A * | 5/1984 | Feigenbaum et al. | 429/457 |
| 4,588,661 | A * | 5/1986 | Kaufman et al. | 429/510 |
| 4,728,533 | A * | 3/1988 | Feigenbaum et al. | 427/598 |
| 4,977,046 | A * | 12/1990 | Bleszinski et al. | 429/224 |
| 5,024,715 | A * | 6/1991 | Trussler | 156/245 |
| 5,169,697 | A * | 12/1992 | Langley et al. | 428/57 |
| 5,292,392 | A * | 3/1994 | Miller et al. | 156/308.4 |
| 5,743,989 | A * | 4/1998 | Kumagai et al. | 156/273.9 |
| 6,159,628 | A * | 12/2000 | Grasso et al. | 429/481 |
| 6,461,757 | B1 * | 10/2002 | Sasayama et al. | 429/59 |
| 6,756,147 | B1 * | 6/2004 | Bronold et al. | 429/465 |
| 6,844,101 | B2 * | 1/2005 | Lee et al. | 429/480 |
| 6,989,214 | B2 * | 1/2006 | Mao et al. | 429/460 |
| 7,235,332 | B2 * | 6/2007 | Zushi et al. | 429/316 |
| 7,390,588 | B2 * | 6/2008 | Yamada et al. | 429/492 |
| 7,914,947 | B2 * | 3/2011 | Osenar et al. | 429/535 |
| 2001/0041276 | A1 * | 11/2001 | Yang et al. | 429/27 |
| 2003/0124402 | A1 * | 7/2003 | Dave | 429/30 |
| 2004/0247982 | A1 * | 12/2004 | Sabin et al. | 429/35 |
| 2005/0084734 | A1 * | 4/2005 | Kobayashi et al. | 429/35 |
| 2005/0255372 | A1 * | 11/2005 | Lertola | 429/44 |

(Continued)

OTHER PUBLICATIONS

Xinran et al., Repair of Thermoplastic Resin Composites by Fusion Bonding, Composites Bonding, ASTM STP 1227, Philadelphia, 1994, pp. 30-44.

*Primary Examiner* — Sonya Mazumdar
(74) *Attorney, Agent, or Firm* — BrooksGroup

(57) ABSTRACT

Exemplary embodiments include a product and a method of a bipolar plate assembly for a fuel cell stack. The bipolar plate assembly includes a first plate with a first border, and a second plate with a second border. A thermoplastic sealant is melted between the first and second borders.

21 Claims, 2 Drawing Sheets

(56) References Cited

U.S. PATENT DOCUMENTS

| | | | |
|---|---|---|---|
| 2005/0263246 A1* | 12/2005 | Yandrasits et al. | 156/307.3 |
| 2005/0271929 A1* | 12/2005 | Sompalli et al. | 429/40 |
| 2006/0073373 A1* | 4/2006 | Andrin et al. | 429/36 |
| 2007/0134538 A1* | 6/2007 | Yuichi et al. | 429/35 |
| 2007/0245547 A1* | 10/2007 | Osenar et al. | 29/623.1 |
| 2007/0298305 A1* | 12/2007 | Van Burdine | 429/34 |
| 2009/0136811 A1* | 5/2009 | Kusakabe et al. | 429/30 |
| 2013/0260274 A1* | 10/2013 | Carnevale et al. | 429/457 |

* cited by examiner

BIPOLAR PLATE ASSEMBLY WITH THERMOPLASTIC SEALANT AND METHOD THEREFOR

TECHNICAL FIELD

The technical field generally relates to products including bipolar plate assemblies, and methods of sealing bipolar plate assemblies.

BACKGROUND

Bipolar plate assemblies are commonly used as components of a fuel cell stack. A bipolar plate assembly may have a pair of separate bipolar plates that form internal channels for coolant flow and external channels for fuel and oxidant flow in the fuel cell stack. In some cases, it may be required to seal the internal channels from the external channels, from the external environment, and from other parts of the fuel cell stack.

SUMMARY OF EXEMPLARY EMBODIMENTS OF THE INVENTION

One exemplary embodiment includes a product which may include a bipolar plate assembly for use with a fuel cell stack. The bipolar plate assembly may include a first plate and a second plate. The first plate may have a first border, and the second plate may have a second border. A thermoplastic sealant may be located between the first border and the second border of the respective first and second plates.

One exemplary embodiment includes a method which may include providing a bipolar plate assembly for a fuel cell stack, the bipolar plate assembly may include a first plate and a second plate. The first plate may have a first border, and the second plate may have a second border. The method may also include locating a thermoplastic film between the first plate and the second plate. The thermoplastic film may be located near the first and second borders of the first and second plates. The method may also include melting the thermoplastic film to form a thermoplastic sealant between the first and second borders of the first and second plates.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
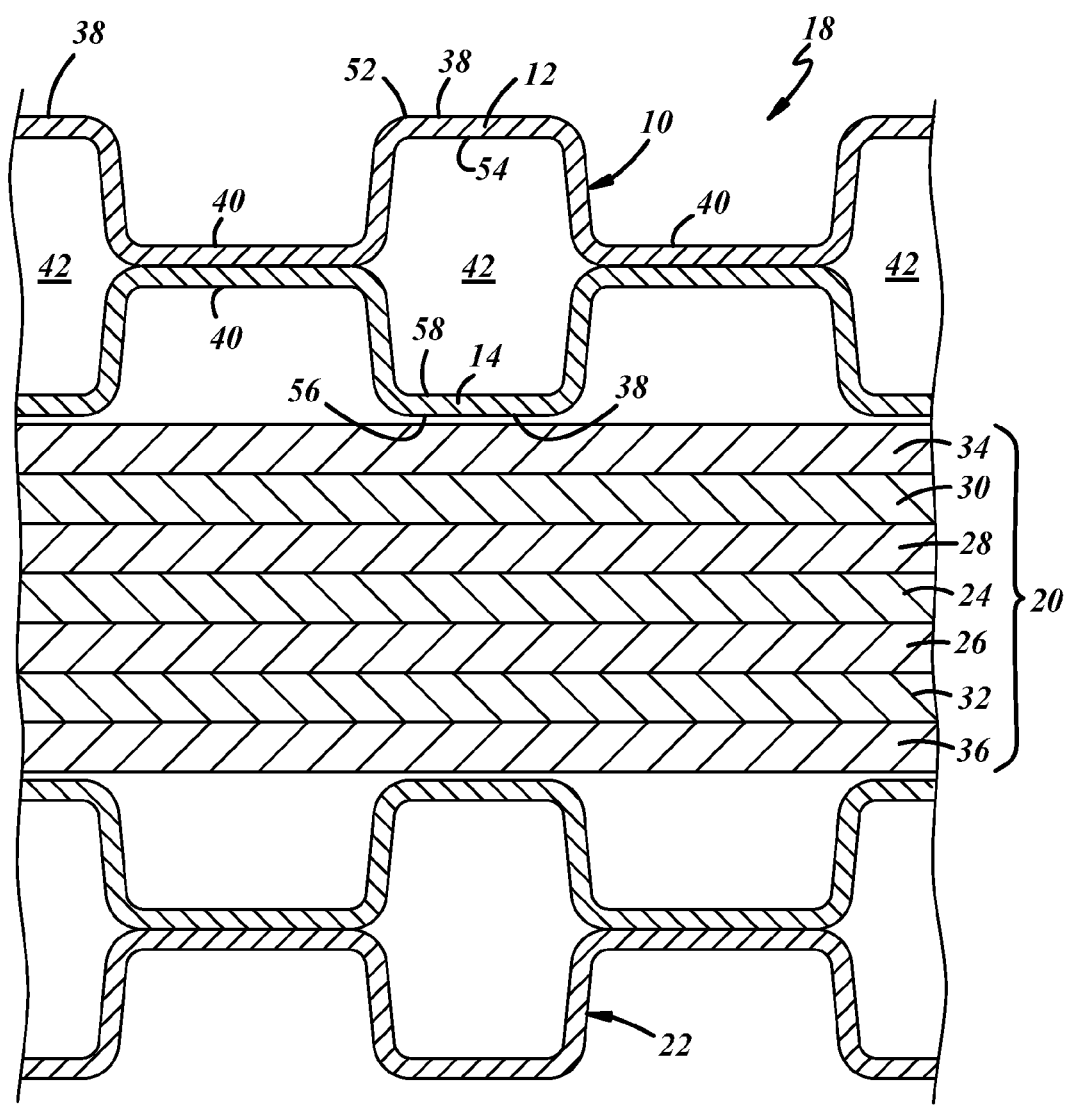
FIG. 1 is a cross-section schematic of an exemplary fuel cell stack.

The following description of the embodiment(s) is merely exemplary (illustrative) in nature and is in no way intended to limit the invention, its application, or uses.

The figures illustrate exemplary embodiments of a bipolar plate assembly 10 and method of sealing a first or anode plate 12 and a second or cathode plate 14 with a thermoplastic sealant or film 16 by way of, for example, a radio frequency (RF) induction heating process. The thermoplastic sealant 16 may have a uniform thickness and may exhibit increased chemical and corrosion resistance as compared to other non-thermoplastic sealants.

Referring to FIG. 1, the bipolar plate assembly 10 may be but one component of a fuel cell stack 18 which may also include a soft goods portion 20 and a second bipolar plate assembly 22 similar to the bipolar plate assembly 10. One exemplary soft goods portion 20 may include a membrane 24, anode and cathode electrodes 26, 28, microporous layers 30, 32, and gas diffusion media layers 34, 36. Each bipolar plate assembly 10, 22 may have a sealed anode and cathode plate via the thermoplastic sealant 16.

The first plate 12 and the second plate 14 may be initially separate pieces that are subsequently put together to form the bipolar plate assembly 10. The first and second plates 12 and 14 may be made of various materials having various electrical conductances including, but not limited to, a carbon steel, an aluminum alloy, a titanium, a stainless steel, or other suitable materials. In one exemplary embodiment, the first and second plates 12, 14 may each include a core material sandwiched between a pair of surface materials. And each plate 12, 14 may define multiple lands 38 and channels 40 providing a reactant gas flow path. When the first and second plates 12, 14 are joined, multiple coolant flow channels 42 may be defined therebetween. In one general example, the first and second plates 12 and 14 may be formed by cutting metal sheets from a roll stock, treating the surfaces of the metal sheets with one or more coatings that may protect against corrosion, dissolving, and which may enhance electric conductivity, and forming a three-dimensional contour in the metal sheets such as by a drawing, stamping, or other processes. Skilled artisans will appreciate the variations in this forming process, including having more, less, and/or different steps than described above.

Figure 2:
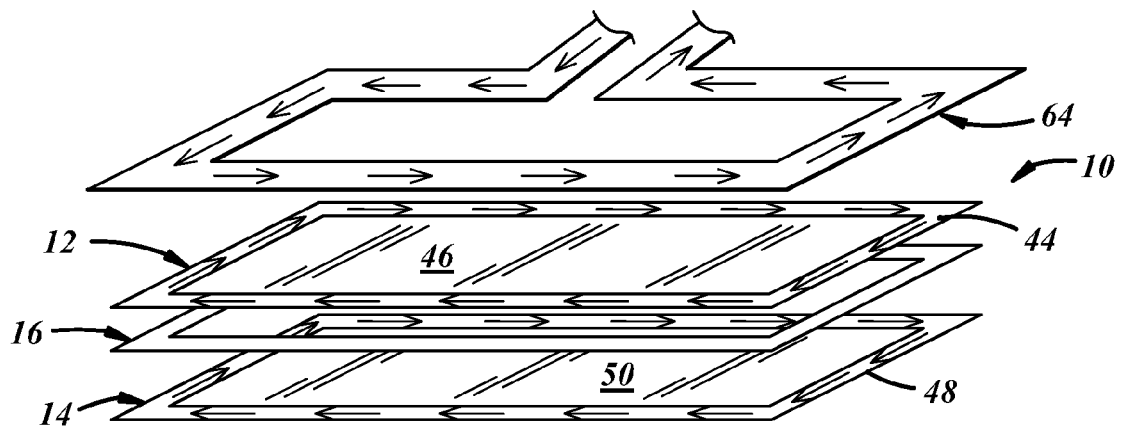
FIG. 2 is a schematic of an exemplary embodiment of a method of making a bipolar plate assembly having a thermoplastic sealant.

Referring to FIGS. 1 and 2, the first plate 12 may have a first border 44 bounding a first central portion 46, and the second plate 14 may have a second border 48 bounding a second central portion 50. The first and second borders 44, 48 may include a peripheral portion of the respective plate that extends beyond the mere edge thereof and inwardly toward their respective central portions. The first plate 12 may also have a first outer surface 52 and an oppositely located first inner surface 54, and the second plate 14 may have a second outer surface 56 and an oppositely located second inner surface 58.

Figure 3:
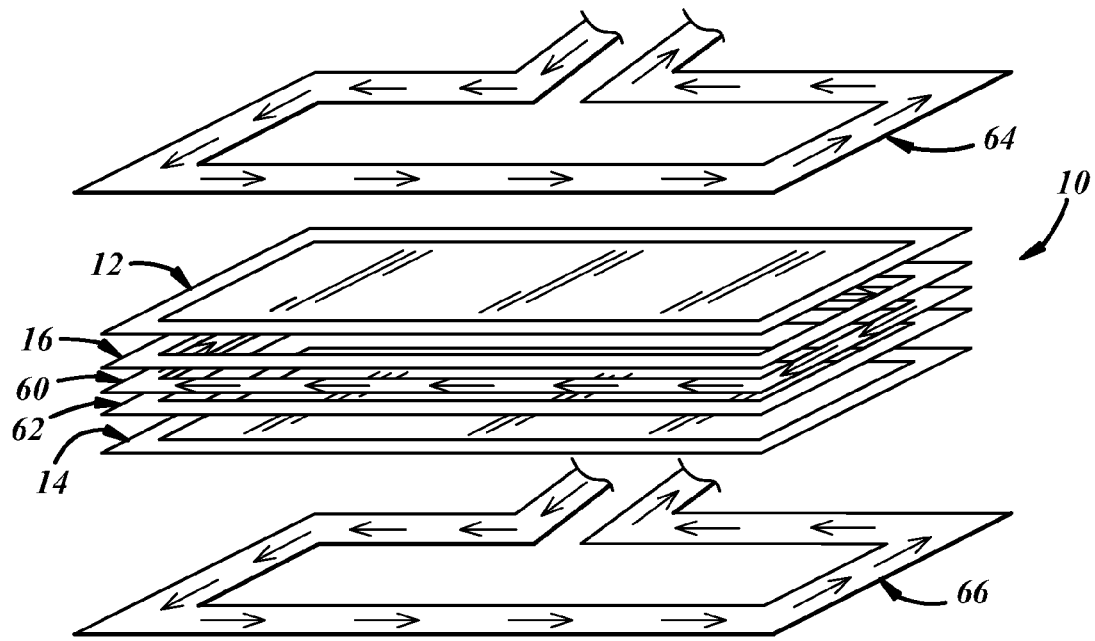
FIG. 3 is a schematic of an exemplary embodiment of a method of making a bipolar plate assembly having a first and second thermoplastic sealant.

Once assembled, melted, and hardened, the thermoplastic sealant 16 forms a bond and seal between the first and second plate 12, 14 at the first and second borders 44, 48. The thermoplastic sealant 16 may replace, though need not, an adhesive bonding and/or a laser welding bonding. Before being melted, the sealant is the thermoplastic film 16 that is shown in FIGS. 2 and 3. The thermoplastic film 16 may be shaped and structured to complement the first and second borders 44, 48; in this example, the thermoplastic film has a rectangular shape that matches the rectangular shape of the borders and has an empty space at its central portion, and has a width that is substantially the same as that of the borders. Exemplary thicknesses of the thermoplastic film 16 may include 0.01 mm, 0.025 mm, 0.05 mm, and thicknesses of greater value.

The thermoplastic film 16 may be comprised of a material exhibiting suitable chemical and corrosion resistance characteristics, as may be needed or desired in a fuel cell operating environment. For example, the thermoplastic film 16 may be comprised of a semi-crystalline thermoplastic material such as polyetheretherketone (PEEK) having a glass transition temperature $T_g$ of 143° C. and a higher melting temperature $T_m$ of 340°, like that known as Stabar XK 300; polyphenylenesulfide (PPS) having a glass transition temperature $T_g$ of 90° C. and a higher melting temperature $T_m$ of 280° C.; polypropylene (PP) having glass transition temperature $T_g$ of −16° C. and a higher melting temperature $T_m$ of 160-176° C.; and polyethylene. Other polymers may be suitable such as those exhibiting suitable crosslinking characteristics upon heating like B-stage polymers.

In the embodiment of FIG. 2, the first and second plate 12, 14 may be comprised of a material having a relatively high electrical conductance such as stainless steel. Here, in the process of making the bipolar plate assembly 10 with the thermoplastic sealant 16, the first and second plates 12, 14 may thus serve as the conductive media. In the embodiment of FIG. 3, on the other hand, the first and second plates 12, 14 may be comprised of a material having a relatively and comparatively low electrical conductance such as composite materials and may need a component to facilitate the electrical conductivity between the first and second plates. Here, in the process of making the bipolar plate assembly 10 with the thermoplastic sealant 16, an electrical conductive substrate 60 may serve as the conductive media and a second thermoplastic film 62 may be used.

The electrical conductive substrate 60 may be comprised of a material which has an electrical conductance value which is greater than that of each of the first and second plates 12, 14. This way, in the process, sufficient heat is generated in order to melt the thermoplastic film 16 into the thermoplastic sealant. In one example, the electrical conductive substrate 60 may be a copper mesh substrate. The electrical conductive substrate 60 may be shaped and structured to complement the first and second borders 44, 48; in this example, the electrical conductive substrate has a rectangular shape that matches the rectangular shape of the borders and has an empty space at its central portion, and has a width that is substantially the same as that of the borders. The electrical conductive substrate 60 may also be shaped and structured to complement the thermoplastic film 16.

The second thermoplastic film 62 may be similar to the first thermoplastic film 16. Once assembled and melted, the first and second thermoplastic sealants 16, 62 form a bond and seal between the first and second plates 12, 14 at the first and second borders 44, 48. Before being melted, the second thermoplastic film 62 may be shaped and structured to complement the first and second borders 44, 48; in this example, the second thermoplastic film has a rectangular shape that matches the rectangular shape of the borders and has an empty space at its central portion, and has a width that is substantially the same as that of the borders. In the embodiment of FIG. 3, exemplary thicknesses of the second thermoplastic film 62 may include 0.005 mm, 0.0125 mm, 0.025 mm, and thicknesses of greater value; while exemplary thicknesses of the first thermoplastic film 16 may include 0.005 mm, 0.0125 mm, 0.025 mm, and thicknesses of greater value.

The second thermoplastic film 62 may be comprised of the same material as that of the first thermoplastic film 16 with which it is used. For example, the second thermoplastic film 62 may be comprised of a semi-crystalline thermoplastic material such as polyetheretherketone (PEEK) having a glass transition temperature $T_g$ of 143° C. and a higher melting temperature $T_m$ of 340°, like that known as Stabar XK 300; polyphenylenesulfide (PPS) having a glass transition temperature $T_g$ of 90° C. and a higher melting temperature $T_m$ of 280° C.; polypropylene (PP) having glass transition temperature $T_g$ of −16° C. and a higher melting temperature $T_m$ of 160-176° C.; and polyethylene. Other polymers may be suitable such as those exhibiting suitable crosslinking characteristics upon heating like B-stage polymers.

One exemplary process of making the bipolar plate assembly 10 with the thermoplastic sealant 16 is by way of an RF induction heating process. In different embodiments, the process need not be performed in the order described below, may differ in one or more particular steps, may have additional steps than those shown and described, and may not necessarily include every step that is shown and described. In general, RF induction heating uses electromagnetic induction generated by one or more induction heaters. Eddy currents are induced in a medium which causes rapid local heat generation in the medium. In an exemplary RF induction heating process, the induction may be targeted at the first and second borders 44, 48 of the first and second plates 12, 14. The induction may also be targeted at the thermoplastic film(s) which is located between the first and second borders 44, 48. The intensity and penetration of the induction may be controlled in a manner to reduce the likelihood of heat-related distortions to the first and second plates 12, 14.

Referring to FIG. 2, a single RF induction heater 64 may be used to generate induction, and thus heat, in the first and second plates 12, 14 in order to melt the thermoplastic film 16 into the sealant. Here, the first and second plates 12, 14 serve as the conductive media for the process. To begin, the first and second plates 12, 14 may be located and held in place with respect to each other, and with respect to the thermoplastic film 16, via one or more fixtures or other suitable ways. The thermoplastic film 16 may be located and sandwiched between the first and second plates 12, 14 by way of a vacuum handling technique, one or more fixtures, screen-printing, or other suitable ways. The thermoplastic film 16 may be preattached to the first inner surface 54 of the first plate 12, may be preattached to the second inner surface 58 of the second plate 14, or need not be preattached to either.

Once located with respect to one another, the first plate 12, the second plate 14, and the thermoplastic film 16 may then be brought together and may make respective contact, and may be held together under pressure by way of one or more fixtures or other suitable ways. The holding pressure may be maintained throughout the RF induction heating process and until cooling is completed. The RF induction heater 64 may direct electromagnetic induction to the first and second borders 44, 48. Eddy currents, schematically represented by arrows in FIG. 2, may travel through the first and second borders 44, 48 and may cause rapid local heat generation at the borders. The heat may melt the thermoplastic film 16 into the thermoplastic sealant. Upon melting and cooling, the now-hardened thermoplastic sealant 16 may conform to the space located between the first and second borders 44, 48, and may form a bond and seal at the borders.

Referring to FIG. 3, the first RF induction heater 64 and a second RF induction heater 66 may be used to generate induction, and thus heat, in the electrical conductive substrate 60 in order to melt the first thermoplastic film 16 and the second thermoplastic film 62 into respective sealants. Here, the electrical conductive substrate 60 serves as the conductive media for the process. To begin, the first and second plates 12, 14 may be located and held in place with respect to each other, and with respect to the first and second thermoplastic films 16, 62 via one or more fixtures or other suitable ways. The thermoplastic films 16, 62 and substrate 60 may be located and sandwiched in the arrangement shown between the first and second plates 12, 14 by way of a vacuum handling technique, one or more fixtures, screen-printing, or other suitable ways; other arrangements are possible such as having an additional electrical conductive substrate located between the plates. The thermoplastic films 16, 62 may be preattached to one or both of the plates 12, 14, may be preattached to the substrate 60, or need not be preattached to any component.

Once located with respect to one another, the plates 12, 14, the thermoplastic films 16, 62, and the substrate 60 may be brought together and may make respective contact, and may be held together under pressure by way of one or more fixtures or other suitable ways. The holding pressure may be maintained throughout the RF induction heating process and until cooling is completed. The first and second RF induction heaters 64, 66 may direct electromagnetic induction to the electrical conductive substrate 60. Eddy currents, schematically represented by arrows in FIG. 3, travel through the substrate 60 and may cause rapid local heat generation in the substrate. The heat may melt the thermoplastic films 16, 62 into the thermoplastic sealant. Upon melting and cooling, the now-hardened thermoplastic sealants 16, 62 may conform to the space located between the first and second borders 44, 48, and may form a bond and seal at the borders. The thermoplastic films 16, 62 may melt into each other to, in a sense, form a single thermoplastic sealant.

The above description of embodiments of the invention is merely exemplary in nature and, thus, variations thereof are not to be regarded as a departure from the spirit and scope of the invention.

What is claimed is:

1. A product comprising:
   a bipolar plate assembly for a fuel cell stack, the bipolar plate assembly including a first plate having a first border and including a second plate having a second border; and
   a thermoplastic sealant located between the first border and the second border and surrounding a peripheral portion of the first plate and a peripheral portion of the second plate, the thermoplastic sealant bonded to the first plate and the second plate.

2. A product as set forth in claim 1 wherein the thermoplastic sealant is melted between the first border and the second border via a radio frequency (RF) induction heating process and wherein the thermoplastic sealant forms a bond and seal between the first and second plate at the first and second borders.

3. A product as set forth in claim 1 wherein the thermoplastic sealant comprises a semi-crystalline thermoplastic.

4. A product as set forth in claim 3 wherein the semi-crystalline thermoplastic comprises polyetheretherketone, polyphenylenesulfide, polypropylene, or polyethylene.

5. A product as set forth in claim 1 further comprising a second thermoplastic sealant located between the first border and the second border, and an electrically conductive substrate located between the first and second thermoplastic sealants.

6. A product as set forth in claim 5 wherein the electrically conductive substrate comprises a copper mesh substrate which is shaped to complement the shape of the first and second thermoplastic sealants.

7. A product as set forth in claim 5 wherein the electrically conductive substrate has an electrical conductance which is greater than an electrical conductance of each of the first and second plates.

8. A product as set forth in claim 5 wherein the second thermoplastic sealant is comprised of the same material as the first thermoplastic sealant.

9. A method comprising:
   providing a bipolar plate assembly for a fuel cell stack, the bipolar plate assembly including a first plate having a first border and including a second plate having a second border;
   locating a thermoplastic film between the first plate and the second plate and adjacent the first and second borders; and
   melting the thermoplastic film to form a thermoplastic sealant between the first and second borders of the first and second plates, and so that the thermoplastic sealant is bonded to the first plate and the second plate.

10. A method as set forth in claim 9 wherein the melting of the thermoplastic film is performed via a radio frequency (RF) induction heating process.

11. A method as set forth in claim 9 wherein the thermoplastic film comprises a semi-crystalline thermoplastic.

12. A method as set forth in claim 11 wherein the semi-crystalline thermoplastic comprises polyetheretherketone, polyphenylenesulfide, polypropylene, or polyethylene.

13. A method as set forth in claim 9 wherein locating a thermoplastic film further comprises locating a second thermoplastic film between the first plate and the second plate and adjacent the first and second borders, and locating an electrically conductive substrate between the first and second thermoplastic films.

14. A method as set forth in claim 13 wherein the electrically conductive substrate comprises a copper mesh substrate which is shaped to complement the shape of the first and second thermoplastic films.

15. A method as set forth in claim 13 wherein the electrically conductive substrate has an electrical conductance which is greater than an electrical conductance of each of the first and second plates.

16. A method as set forth in claim 13 wherein the second thermoplastic film is comprised of the same material as the first thermoplastic film.

17. A method as set forth in claim 9 wherein at least one of the first plate or second plate comprises a metal sheet.

18. A method as set forth in claim 9 wherein at least one of the first plate or second plate consists essentially of a metal.

19. A method as set forth in claim 9 wherein at least one of the first plate or second plate comprises a sheet of carbon steel, aluminum alloy, titanium, or stainless steel.

20. A method as set forth in claim 17 wherein at least one of the first plate or second plate has a reactant gas flow field defined therein.

21. A product as set forth in claim 1 wherein the thermoplastic sealant is constructed and arranged to form a bond and seal between the first and second plate at the first and second borders.

* * * * *